June 20, 1939.  C. RACH  2,163,468
PROCESS OF MAKING HOPPED BEER WORT
Filed July 28, 1936
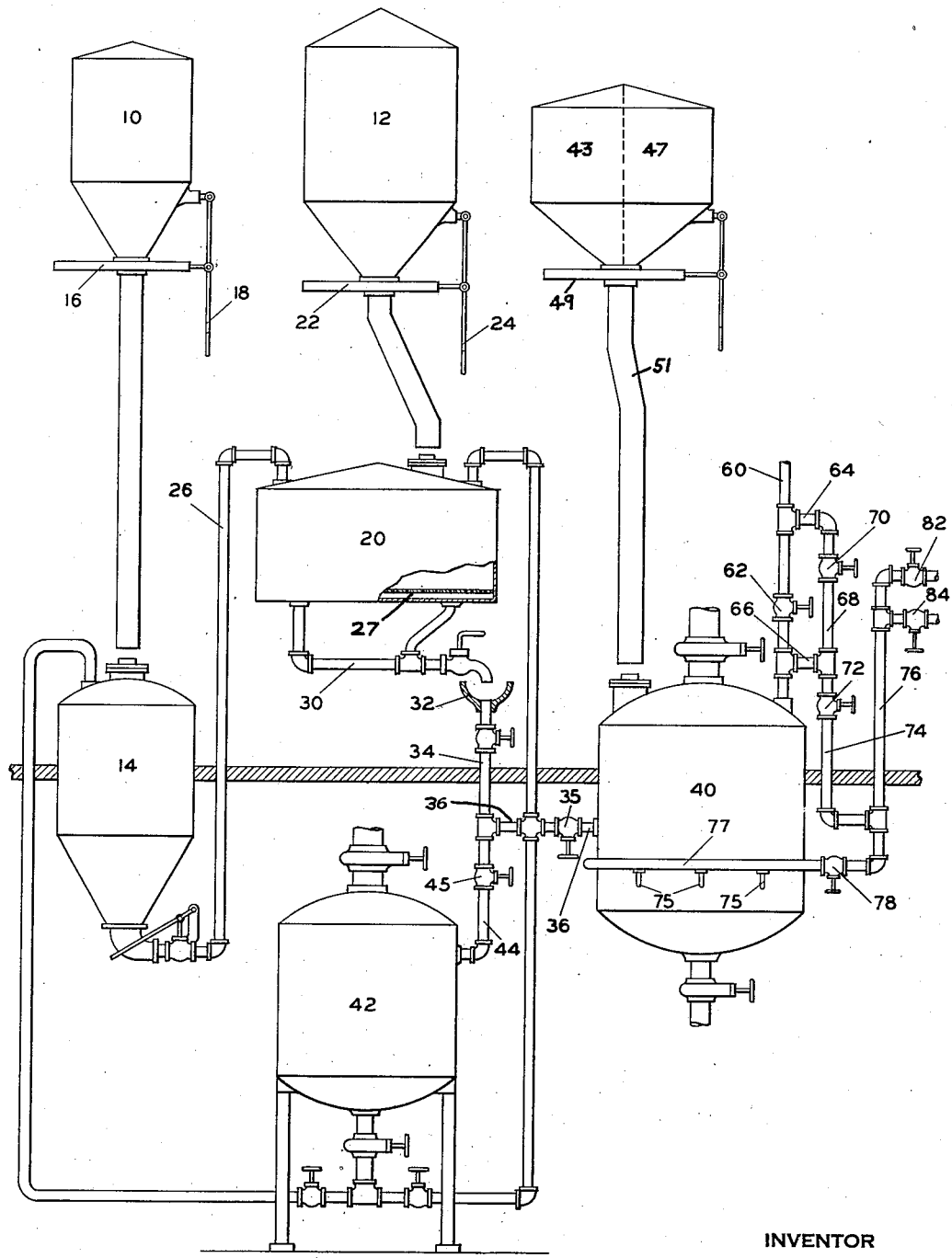
INVENTOR
CARL RACH
BY HIS ATTORNEYS
Howson and Howson Patented June 20, 1939

2,163,468

UNITED STATES PATENT OFFICE 2,163,468

PROCESS FOR MAKING HOPPED BEER WORT

Carl Rach, New York, N. Y.

Application July 28, 1936, Serial No. 93,078

3 Claims. (Cl. 99—52)

According to the present day method of making beer, hopped beer wort is made from malt and hops, or from malt and unmalted cereals and hops. This wort, when placed into vats, is fermented and is aged and processed to complete the manufacture of the beer. The present invention relates to the making of the hopped beer wort.

Heretofore in the process of making this wort, unmalted cereals (such as corn grits or rice) were mixed with malt (such as malt barley or wheat malt) and were cooked with water at a temperature around the boiling point in a large container or cooker, the resulting mixture being led from the cooker into a mash tub where it was mixed with a malt mash and kept for one-half hour or more at mashing off temperature. The wort which resulted from this last mashing operation was strained through the undissolved grains of the material or mash resting upon a false bottom, with which the mash tub is provided. During this operation the undissolved grains on the false bottom served as a filter mass.

The usual practice in the next stage of the old process was to wash the grains by pouring hot water upon them in the mash tub to remove the remaining wort extract. This washing of the grains or sparging operation, as commonly called, resulted in a wort which was of much lower density than the wort which was first obtained. As the sparging operations continued the resulting worts were of less and less density and after they were all collected together in a large kettle they had to be boiled to evaporate some of the water and increase the density to the desired degree, which is between 12 to 13% as measured by the Balling saccharometer.

This evaporation and concentration of the wort was disadvantageous in that it required time, labor and fuel and thus increased the cost of the beer.

Thus it is an object of my invention to provide a process which eliminates the necessity of boiling the wort to concentrate it, and thus (1) to reduce the expense of the process, and (2) to permit greater control of the composition and chemical nature of the product, by reason of boiling being carried on only to chemically affect the wort and not to evaporate water.

Heretofore, during the evaporation, hops were introduced and boiled with the wort to produce the hopped beer wort. The boiling of the wort with the hops extracted the hop constituents and the amount and quality of the hops finally and ultimately determined the degree of bitterness and character of the wort. The necessity of boiling and concentrating the wort while the hops were added was disadvantageous since it subjected the hops to prolonged boiling and did not permit accurate control of the degree of heat treatment of the hops and the amount of hopped constituents which should properly go into the wort.

Thus another object of my invention is to provide a process permitting the heat treatment of the hops with the wort for only so long a time as is necessary to add to the wort the desired amount of hopped constituents and to change these constituents chemically to produce hopped beer wort of whatever character may be desired.

Heretofore in adding the hops to the wort the leaves have not been separated from the lupulin. Thus both parts of the plant received the same treatment although it has long been known that they contain different chemical substances. Therefore the quality of the beer as affected by the hops has not been subject to accurate control.

Thus it is another object of my invention to provide a process for more accurately controlling the amount of hop constituents in the wort and to treat the leaves and lupulin each at a more suitable temperature than heretofore.

Other objects and advantages of my invention will become apparent as it is described in connection with the accompanying drawing.

In the drawing is diagrammatically shown apparatus for carrying out my new process for making hopped beer wort.

In describing the invention I will refer to quantities of solid material and water such as would be needed to make 300 barrels of wort having 12 to 13% Balling concentration. Obviously these proportions may be varied and they are given not as limitations but merely by way of example.

For each barrel of wort to be made, I take 60 pounds of solid material, preferably in the proportions of 45 pounds of malt and 15 pounds of white hominy corn grits. For each 100 pounds of solid material I use one barrel of water for mashing in.

Referring to the drawing, all the grits are placed in a hopper 10 and most of the malt is placed in a hopper 12 but a small amount of malt (5 pounds to every 15 pounds of grits) may be placed in with the grits.

The grits are delivered into a cooker 14 when the gate 15 is opened by handle 18. A cooker suitable for use in mashing the grits is described in my Patent No. 493,342. In this cooker the grits are cooked under pressure above boiling temperature for a suitable time, i. e. two or three hours.

Meantime the malt from hopper 12 is delivered into a mash-lauter tub 20 when the gate 22 is opened by handle 24. In this tub the malt mash is maintained at 30° Reaumur for one hour or more.

Then the boiled grits or raw cereal mash from cooker 14 is forced into the mash-lauter tub through pipe 26, by pressure of the steam in the cooker 14 and the final mashing off takes place at 60° Reaumur. During the mashing off I introduce through the false bottom 27, with which the mash tub 20 is provided, an additional 30 barrels of boiling water. The combined raw grain and malt mash is kept at rest for one half hour or more after which time the lautering begins.

As soon as the wort runs clear I draw off in the usual way 125 barrels of first wort having a concentration of 20% Balling. The first runnings of unclear wort are returned to the tub 20. The wort is drawn off through a series of pipes 30 connected to the bottom of the mash-lauter tub 20 and is collected in a trough 32 from which it runs through a pipe 34 and a branch pipe 36 into a pressure kettle 40 of the type described in my U. S. Patent No. 493,342.

I now introduce or sparge into the mash-lauter tub 20, 125 barrels of water at 63° Reaumur and draw off 100 barrels of second wort having a concentration of 10% Balling. I then sparge another 100 barrels of water at 63° Reaumur and draw off 75 barrels of wort having a concentration of 5% Balling. These worts also are run into the kettle 40. I arrange the amount and quality of the worts so that the concentration of the three of them when combined in the pressure kettle 40 will be between 10 and 15%, preferably 12 to 13% Balling. This is the proper concentration for the introduction of the hops, but before describing the further processing of the worts in the kettle 40 I will describe the further treatment of the material remaining in the mash-lauter tub.

After the third or 5% wort has been drawn off from the mash-lauter tub 20, I sparge another 100 barrels of water at 63° Reaumur over the grains in the tub and collect the wort in a kettle 42 into which it is led by pipes 30, 34, 44 from the mash-lauter tub 20, the valve 45 in pipe 44 being open and the valve 35 in pipe 36 being closed during this drawing off. This wort has a concentration of about 5% to 3% Balling. In the pressure kettle this wort is heated to 90° Reaumur or possibly just to boiling and is thus sterilized and may be stored. By the use of my pressure kettle the souring and chemical change of this wort is eliminated.

When the next brew is made this light wort in kettle 42 will be used in place of mashing in water, whereby the worts resulting from operations in the second brew will be of higher concentration than if pure water were used. Also the use of these light worts in this way avoids the necessity, as in the old process, of prolonged boiling of the collected worts. This makes the present process more economical than prior processes.

In order that the amount of extract contained in the stored wort may be deducted from the material of the succeeding brew, the exact contents of the stored wort are computed. About 200 barrels of 3% wort corresponds to 1800 pounds of wort extract, which may be deducted from the succeeding brew.

It will be noted that I started off with 60 pounds of solid material for each barrel of wort to be made, as contrasted with 50 pounds in the old process. The 10 pounds excess was for the purpose of creating the stock of weak wort in the storage kettle 42. The second and succeeding brews may be made with the usual 50 pounds more or less of solids per barrel of wort, depending on what the analysis of the stored wort shows as to its malt extract content.

Looking now to the kettle 40, in which are the worts averaging about 12% Balling, I raise the temperature of these to the boiling point and at this time the hops may be added. The hops may be stored in a hopper having two compartments 43 and 47 in which the leaves and the lupulin are separately stored. A gate 49 controls the delivery of leaves or lupulin through the chute 51 to the kettle 40. About one-half to 1 pound or more hops are added per barrel of wort. The boiling is done without evaporation under pressure up to 15 pounds but preferably from 3 to 10 pounds, to coagulate albumin and obtain the "break". By boiling under pressure at higher temperatures the "break" takes place rapidly and thoroughly. By boiling without evaporation I mean that the boiling is not continued a sufficient length of time for substantial evaporation to take place, nor is the boiling vigorous enough to cause substantial evaporation in a short time.

At present there is little actual knowledge of the chemistry of the action of the hops on the wort. Hops are chosen by eye test and by the region where good hops grow. The amount of hops used is largely based on guesswork.

The hops can be divided into leaves, stems and lupulin. The leaves and stems are of the same substances and contain tanin, proteins and mineral substances. The lupulin is formed by natural oxidation of the hop oil and contains two kinds of bitter acids, humulon and lupulon.

Through energetic boiling with the wort the humulon and lupulon are changed into alpha resin, and beta resin, respectively, by contact with the air in the wort. Both resins can be changed through further oxidation into gamma resin which is insoluble in the wort and has no value in brewing of beer. The alpha and beta resins have the character of bitter acids and by a series of chemical actions these bitter compounds get into the wort and produce bitterness in the beer when the wort is fermented. The humulon and the alpha resin are oxidized quicker than the lupulon and beta resin so that by forcing air through the wort the rapid oxidation of humulon and alpha resins proceeds rapidly and thus it is possible proportionately to augment lupulon and the beta resins in the wort.

When operating with an ordinary beer kettle regulation of the hop extractives is impossible but by using my pressure kettle and introducing the leaves and lupulin separately and subjecting them to separate heat treatments at the predetermined temperatures under regulated pressure, some degree of regulation and control of the amount of hop extractives going into the wort is attained.

I introduce the lupulin and boil at 90° Reaumur under a pressure of approximately 10 pounds, and then I lower the temperature to 85° Reaumur and introduce the leaves and boil at a pressure of approximately 5 pounds.

In order to effect a vigorous agitation of the wort with the hops in the pressure kettle 40 and to regulate the pressure and temperature therein and thus to control the amount of hop oil and bitter acids and resins in the wort I force, alternately, a stream of live steam and a stream of compressed air through the wort, regulating the process and pressure with a system of valves as will now be described. To the top of the pressure kettle 40 is connected a pipe 60. In this pipe 60 there is a large valve 62. In the pipe 60 above and below the valve 62 are provided branch pipes 64 and 66 connecting with another pipe 68 which is connected to steam and compressed air lines appropriately through pipes 74 and 76. In the pipe 68, between its connections to the branch pipes 64 and 66, there is a small valve 70 and on the opposite side of the branch pipe 66 in the pipe 68 is a steam and air shut off valve 72.

From the above it will be readily understood that if the large valve 62 is opened there will be a large orifice open to atmosphere through the pipe 60 permitting a reduction in pressure within the kettle 40. However, if the large valve 62 is closed and the smaller valve 70 is open, a smaller aperture will be open to the atmosphere through pipes 66, 68, 64 and 60 and there will be a lesser reduction in pressure. If both valves 62 and 70 are closed and it is desired to introduce steam into the top part of the kettle this may be accomplished by opening the valve 72 which is in the steam connection pipe 74. To effect vigorous agitation of the wort the steam and compressed air normally will be introduced into the kettle at the bottom portion through a series of nozzles 75 around the bottom of the kettle which are fed by a header 77 connected to pipe 76 and is controlled by a valve 78. Valves 82 and 84 may control whether steam or compressed air shall be in the pipe 76.

Variations within the scope of my invention will occur to those skilled in the art.

I claim—

1. In the process of making hopped beer wort, the steps of cooking wort with the components of hops added separately, the lupulin being cooked under a pressure of about 10 pounds at about boiling temperature, and the leaves being cooked at about 5 pounds pressure and about boiling temperature, said cooking to be done without substantial evaporation of water.

2. In the process of making hopped beer wort, the steps of collecting a series of worts having various concentrations between approximately 5% and 20% Balling and mixing said worts to form a combination wort having a concentration of between 10 and 15% Balling, and cooking said wort with the components of hops added separately, the lupulin being cooked under a pressure of about 10 pounds at about boiling temperature, and the leaves being cooked at about 5 pounds pressure and about boiling temperature, said cooking to be done without substantial evaporation of water.

3. In the process of making hopped beer wort, the steps of collecting the concentrated worts of a brew, said concentrated worts having various concentrations between approximately 5% and 20% Balling and mixing said concentrated worts to form a combination wort having a concentration of between 10 and 15% Balling, and cooking said combination wort with the components of hops added separately, the lupulin being cooked under a pressure of about 10 pounds, and the leaves being cooked at about 5 pounds pressure, said cooking to be done without substantial evaporation of water, and the step of collecting together from said brew the weak worts resulting from sparging during the lautering process and having a concentration of between 2 and 5% Balling, keeping said weak wort separate from the heavier worts and heating said weak wort to approximately 90° Reaumur to sterilize it, and using it with the mash in a subsequent brew.

CARL RACH.